United States Patent
Pischel

(10) Patent No.: US 6,487,471 B1
(45) Date of Patent: Nov. 26, 2002

(54) METHOD AND EQUIPMENT ALLOCATING INDUSTRIAL OR TECHNICAL RESOURCES WITHIN TECHNICAL SYSTEMS

(76) Inventor: Jochen Pischel, Tegtmeyerallee 5, D-30453, Hannover (DE)

( * ) Notice: Subject to any disclaimer, the term of this patent is extended or adjusted under 35 U.S.C. 154(b) by 0 days.

(21) Appl. No.: 09/554,095

(22) PCT Filed: Jan. 13, 1999

(86) PCT No.: PCT/EP99/00156
§ 371 (c)(1),
(2), (4) Date: Jun. 30, 2000

(87) PCT Pub. No.: WO99/36843
PCT Pub. Date: Jul. 22, 1999

(30) Foreign Application Priority Data

Jan. 15, 1998 (DE) .......................... 198 01 177

(51) Int. Cl.[7] ............................................. G05B 19/418
(52) U.S. Cl. ............................................. 700/99; 705/8
(58) Field of Search ..................... 700/97, 99; 705/7, 705/8; 709/104; 455/3.04

(56) References Cited

U.S. PATENT DOCUMENTS 5,343,388 A   8/1994   Wedelin ............... 364/402
5,794,224 A * 8/1998   Yufik .................... 706/14

FOREIGN PATENT DOCUMENTS

| DE | 42 27 727 | 8/1992 |
| DE | 44 25 348 | 7/1994 |
| DE | 196 09 081 | 3/1996 |
| EP | 0 248 812 | 10/1990 |

* cited by examiner

Primary Examiner—Paul P. Gordon
(74) Attorney, Agent, or Firm—Shlesinger, Arkwright & Garvey LLP

(57) ABSTRACT

A method for allocating industrial or technical resources within technical systems, in particular to avert malfunctions, the system's operational state being represented by at least two parameter values, in such manner that as regards at least three different system operational states (Examples) at each of which at least one predetermined system function has been attained, the parameter value associated with the particular operational state is detected by detectors and is stored in a memory and in that, by means of pairwise comparison each time of two operational states and represented by the associated parameter values, a gauge is ascertained for the effect of the individual parameters on system function. The method of the invention allows quick and efficient resource allocation within technical systems, malfunctioning of such systems being reliably avoidable. Equipment of the invention operates on the principle of the method of the invention.

17 Claims, 15 Drawing Sheets

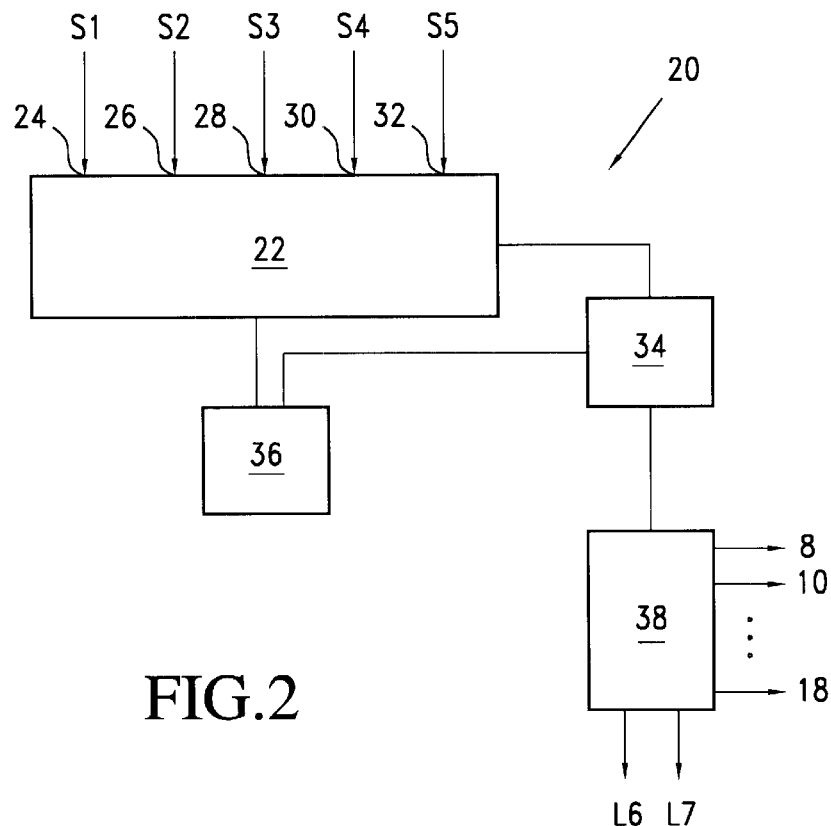

FIG.2

Figure 1:
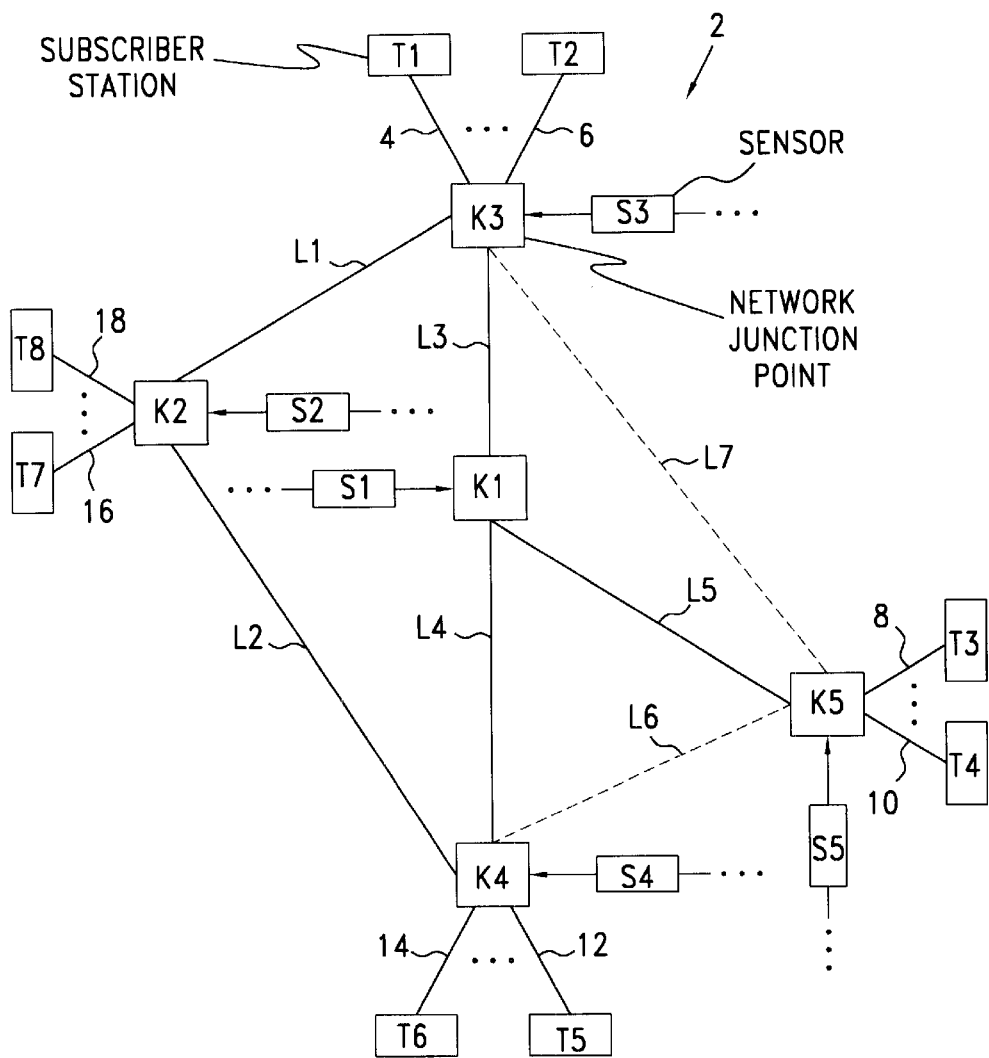
Figure 11A:
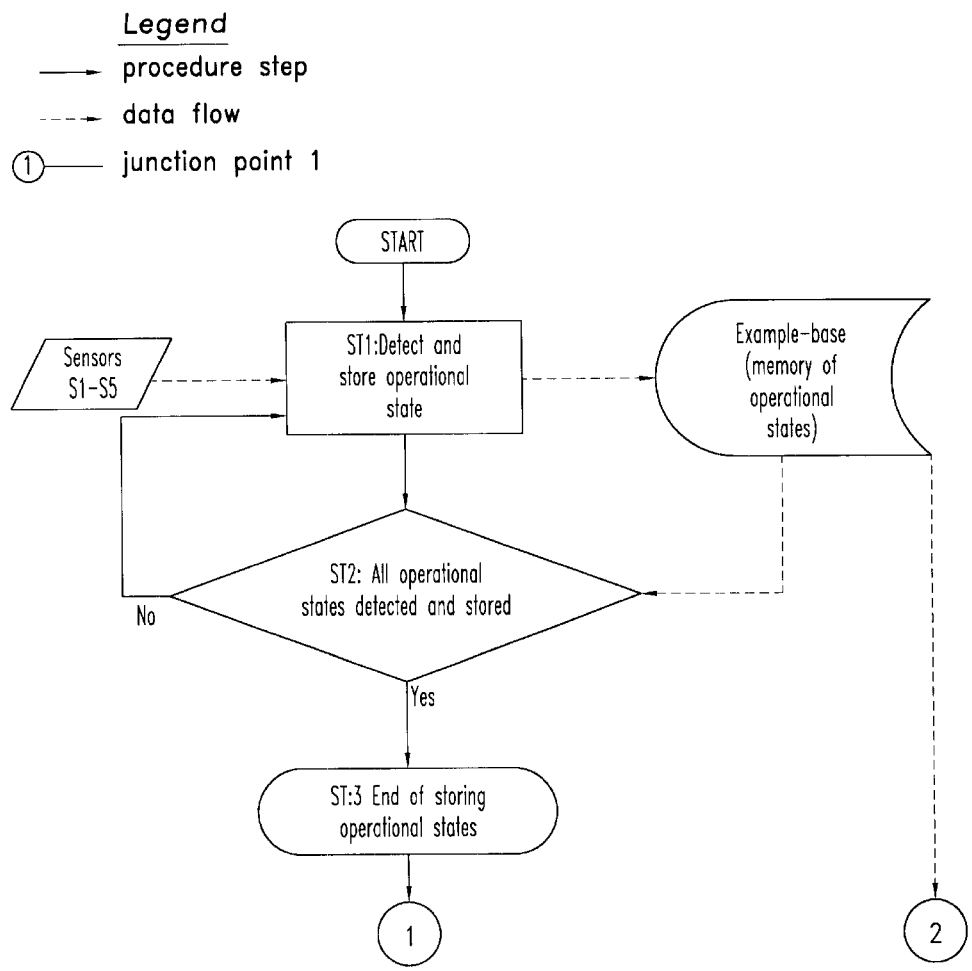
Figure 11B:
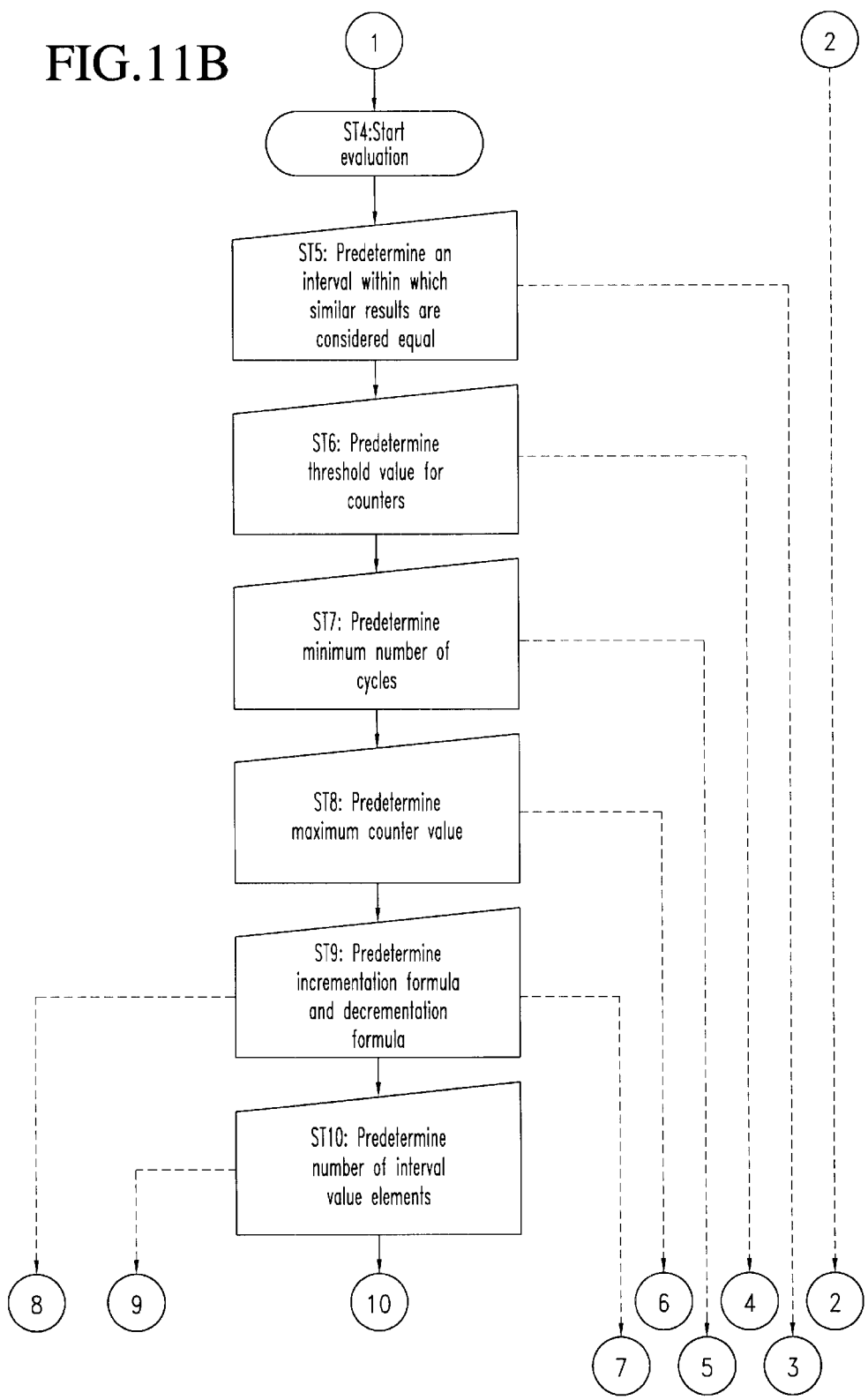
Figure 11C:
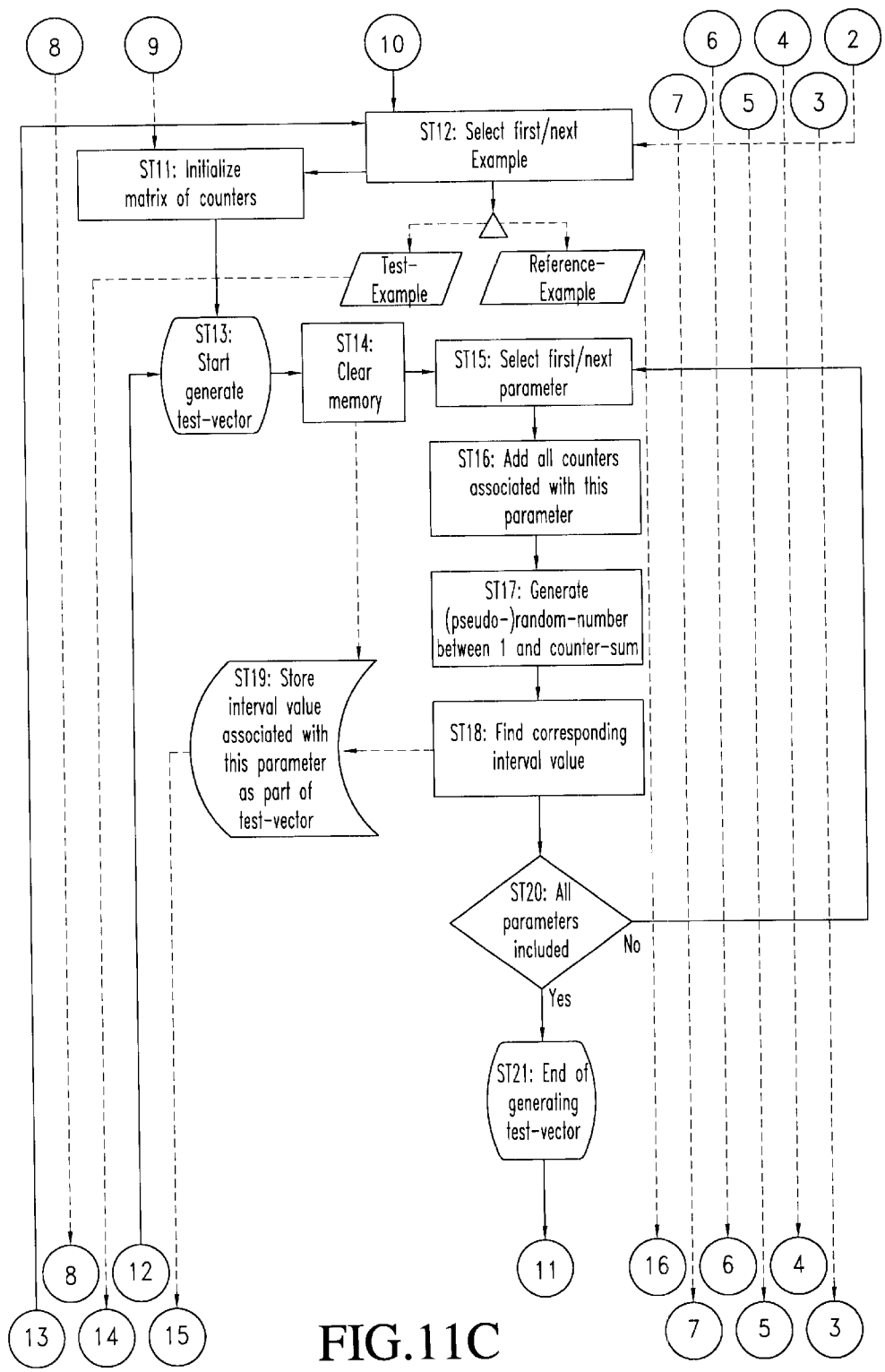
Figure 11D:
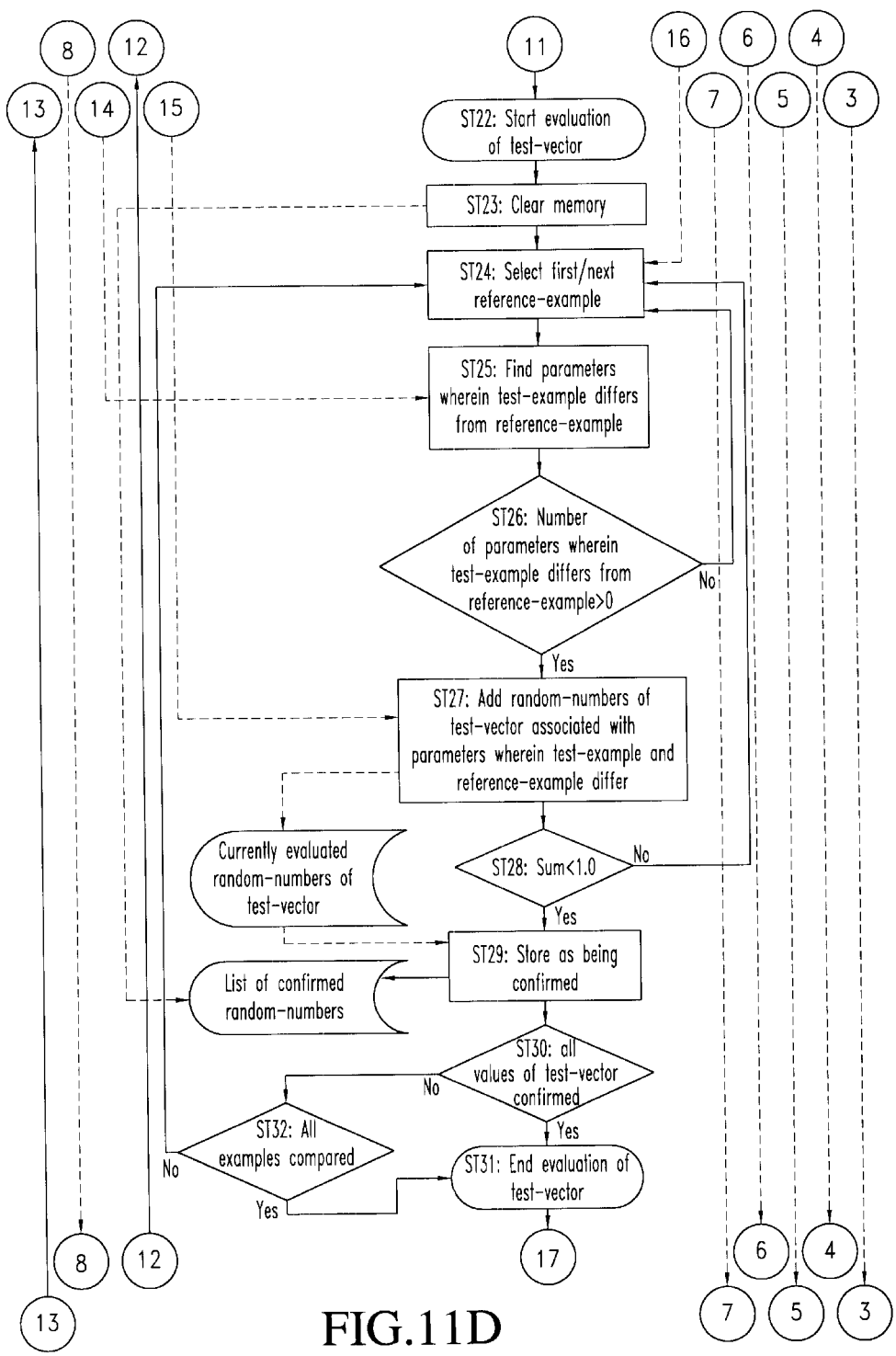
Figure 11E:
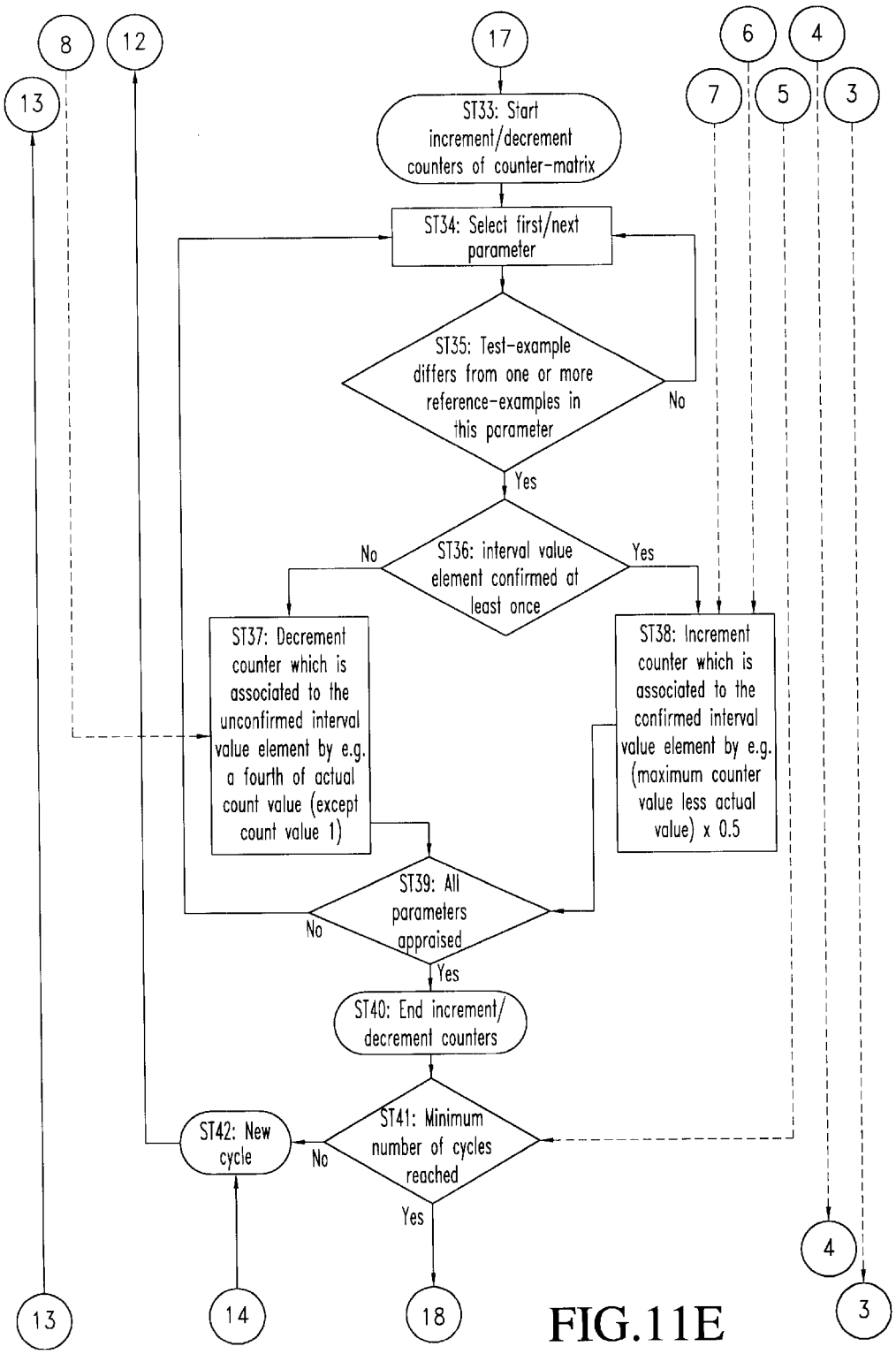
Figure 11F:
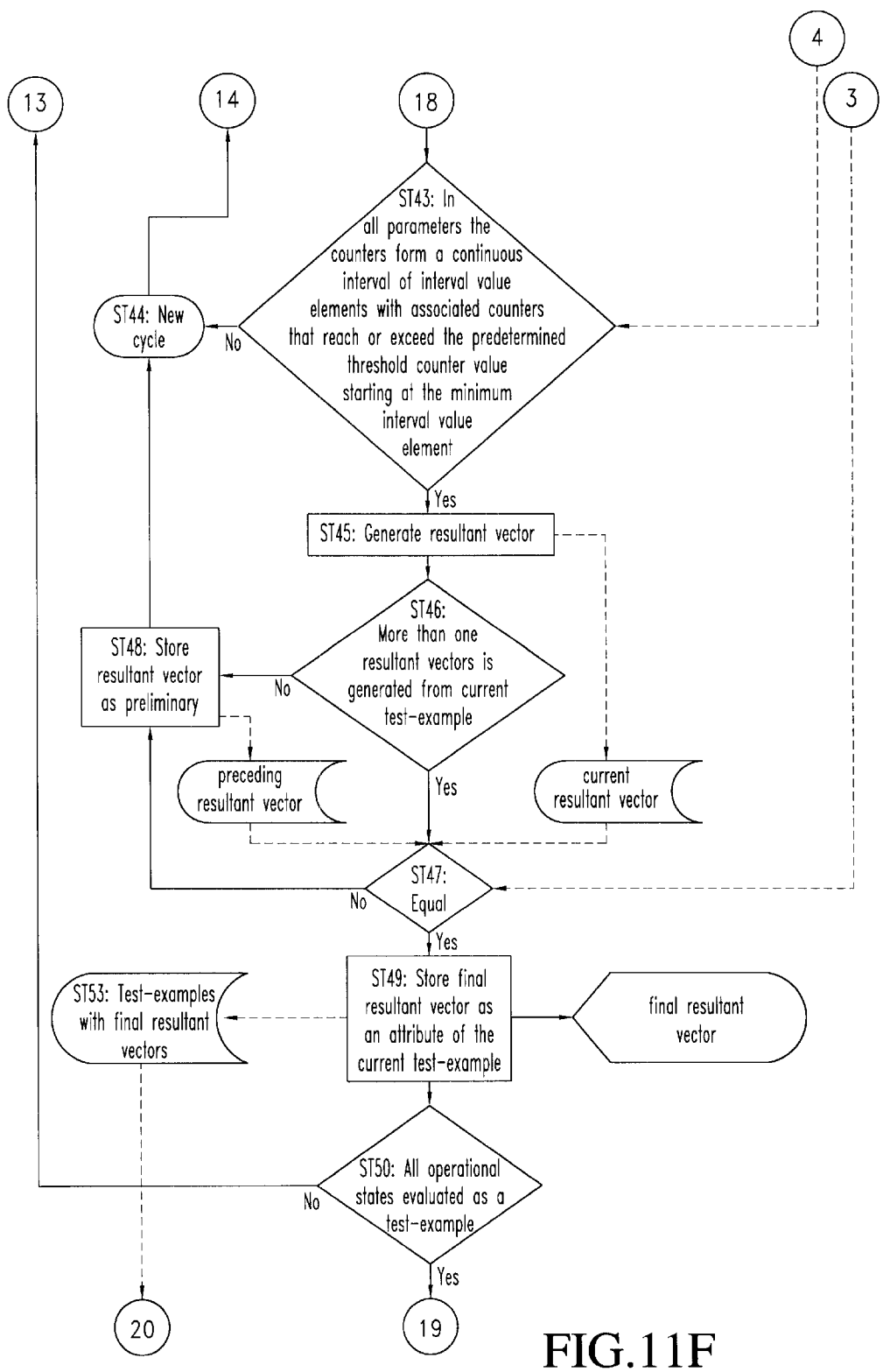
Figure 11G:
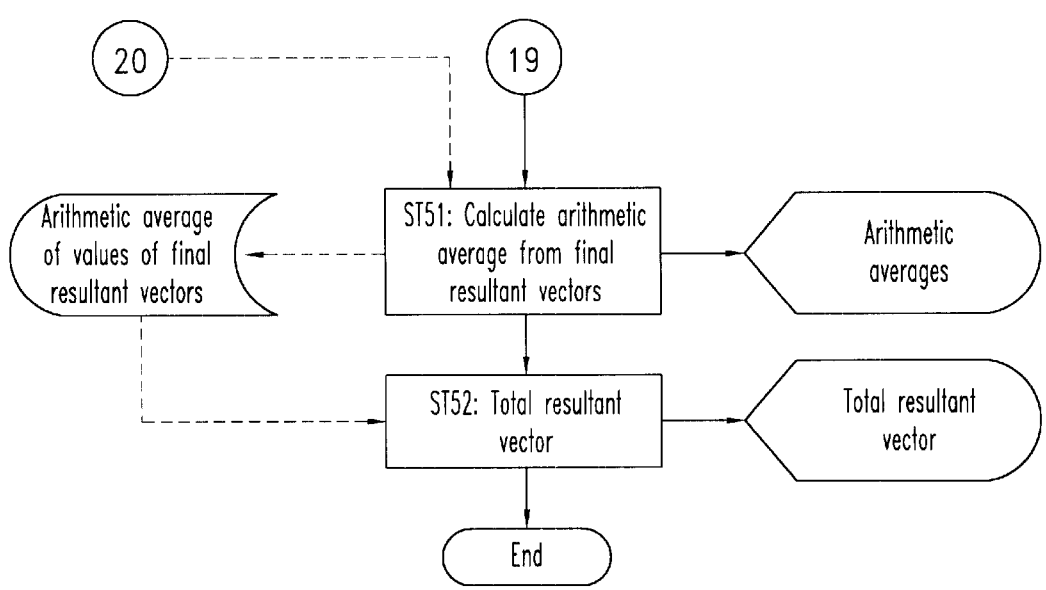

|  | K1 | K2 | K3 | K4 | K5 |
|---|---|---|---|---|---|
| B1 | normal | overload | overload | overload | normal |
| B2 | normal | normal | normal | overload | normal |
| B3 | normal | overload | overload | normal | overload |
| B4 | normal | overload | normal | overload | normal |
| B5 | overload | normal | normal | normal | normal |
| B6 | normal | normal | normal | normal | overload |
| B7 | normal | overload | overload | normal | normal |
| B8 | normal | normal | normal | normal | normal |
| B9 | normal | normal | overload | normal | normal |
| B10 | normal | overload | normal | normal | normal |

FIG.3

|   | K1 | K2 | K3 | K4 | K5 |
|---|----|----|----|----|----|
|   | .5 | .4 | .6 | .8 | .1 |

FIG.4A

|      | K1 | K2 | K3 | K4 | K5 |
|------|----|----|----|----|----|
| .0   | 1  | 1  | 1  | 1  | 1  |
| .1   | 1  | 1  | 1  | 1  | 51 |
| .2   | 1  | 1  | 1  | 1  | 1  |
| .3   | 1  | 1  | 1  | 1  | 1  |
| .4   | 1  | 1  | 1  | 1  | 1  |
| .5   | 1  | 1  | 1  | 1  | 1  |
| .6   | 1  | 1  | 51 | 1  | 1  |
| .7   | 1  | 1  | 1  | 1  | 1  |
| .8   | 1  | 1  | 1  | 51 | 1  |
| .9   | 1  | 1  | 1  | 1  | 1  |
| 1.0  | 1  | 1  | 1  | 1  | 1  |

FIG.4B

|   | K1  | K2 | K3 | K4 | K5 |
|---|-----|----|----|----|----|
|   | 1.0 | .3 | .6 | .8 | .1 |

FIG.5A

|     | K1 | K2 | K3 | K4 | K5 |
|-----|----|----|----|----|----|
| .0  | 1  | 1  | 1  | 1  | 1  |
| .1  | 1  | 1  | 1  | 1  | 76 |
| .2  | 1  | 1  | 1  | 1  | 1  |
| .3  | 1  | 51 | 1  | 1  | 1  |
| .4  | 1  | 1  | 1  | 1  | 1  |
| .5  | 1  | 1  | 1  | 1  | 1  |
| .6  | 1  | 1  | 76 | 1  | 1  |
| .7  | 1  | 1  | 1  | 1  | 1  |
| .8  | 1  | 1  | 1  | 76 | 1  |
| .9  | 1  | 1  | 1  | 1  | 1  |
| 1.0 | 1  | 1  | 1  | 1  | 1  |

FIG.5B

|  | K1 | K2 | K3 | K4 | K5 |
|---|---|---|---|---|---|
|  | 1.0 | .3 | .6 | .8 | .1 |

FIG.6A

|  | K1 | K2 | K3 | K4 | K5 |
|---|---|---|---|---|---|
| .0 | 1 | 1 | 1 | 1 | 1 |
| .1 | 1 | 1 | 1 | 1 | 88 |
| .2 | 1 | 1 | 1 | 1 | 1 |
| .3 | 1 | 76 | 1 | 1 | 1 |
| .4 | 1 | 1 | 1 | 1 | 1 |
| .5 | 1 | 1 | 1 | 1 | 1 |
| .6 | 1 | 1 | 88 | 1 | 1 |
| .7 | 1 | 1 | 1 | 1 | 1 |
| .8 | 1 | 1 | 1 | 88 | 1 |
| .9 | 1 | 1 | 1 | 1 | 1 |
| 1.0 | 1 | 1 | 1 | 1 | 1 |

FIG.6B

|    | K1 | K2 | K3 | K4 | K5 |
|----|----|----|----|----|----|
|    | .3 | .0 | .9 | .3 | .0 |

FIG.7A

|     | K1 | K2  | K3  | K4  | K5  |
|-----|----|-----|-----|-----|-----|
| .0  | 30 | 100 | 100 | 100 | 100 |
| .1  | 3  | 100 | 100 | 1   | 71  |
| .2  | 1  | 100 | 1   | 100 | 41  |
| .3  | 9  | 100 | 100 | 100 | 51  |
| .4  | 5  | 99  | 100 | 100 | 87  |
| .5  | 5  | 73  | 100 | 100 | 1   |
| .6  | 3  | 69  | 100 | 100 | 12  |
| .7  | 1  | 12  | 100 | 1   | 1   |
| .8  | 1  | 68  | 100 | 100 | 4   |
| .9  | 1  | 1   | 100 | 100 | 1   |
| 1.0 | 1  | 1   | 1   | 1   | 1   |

FIG.7B

|  | K1 | K2 | K3 | K4 | K5 |
|---|---|---|---|---|---|
|  | .9 | .6 | .8 | .9 | .5 |

FIG.8A

|  | K1 | K2 | K3 | K4 | K5 |
|---|---|---|---|---|---|
| .0 | 3 | 100 | 100 | 100 | 100 |
| .1 | 31 | 100 | 100 | 100 | 75 |
| .2 | 3 | 87 | 100 | 100 | 100 |
| .3 | 3 | 99 | 100 | 100 | 93 |
| .4 | 3 | 91 | 100 | 100 | 73 |
| .5 | 3 | 99 | 100 | 100 | 54 |
| .6 | 3 | 60 | 100 | 100 | 9 |
| .7 | 1 | 70 | 100 | 100 | 80 |
| .8 | 1 | 49 | 100 | 100 | 3 |
| .9 | 1 | 6 | 100 | 100 | 4 |
| 1.0 | 1 | 1 | 1 | 1 | 1 |

FIG.8B

|     | K1  | K2 | K3 | K4 | K5  |
|-----|-----|----|----|----|-----|
| B1  | 1.0 | .5 | .0 | .0 | .7  |
| B2  | .7  | .0 | .4 | .0 | .9  |
| B3  | 1.0 | .2 | .4 | .8 | .0  |
| B4  | 1.0 | .0 | .0 | .0 | 1.0 |
| B5  | .0  | .5 | .8 | .7 | .7  |
| B6  | .7  | .3 | .3 | .6 | .0  |
| B7  | 1.0 | .0 | .0 | .0 | .0  |
| B8  | .0  | .0 | .0 | .0 | .0  |
| B9  | .8  | .0 | .0 | .7 | .6  |
| B10 | .6  | .0 | .0 | .0 | .4  |

FIG.9

| K1 | K2 | K3 | K4 | K5 |
|----|----|----|----|----|
| .7 | .2 | .2 | .3 | .4 |

FIG.10

METHOD AND EQUIPMENT ALLOCATING INDUSTRIAL OR TECHNICAL RESOURCES WITHIN TECHNICAL SYSTEMS

The invention relates to a method and equipment allocating industrial or technical resources within technical systems, in particular for the purpose of precluding technical system malfunctions.

As regards many technical systems, and depending on their configuration or operation, there is only limited availability of industrial or technical resources. For instance in a communications network where the subscribers are coupled by junction points, only a limited number of transmission lines are available to connect said junction points through which the subscribers communicate with each other. On account of overloads in portions of this network, operational circumstances may arise in it which shall render impossible its desired operation to transmit data from one arbitrary subscriber station to another. As a consequence of such network malfunctions, its data transmissions may over some time be impossible or at less than the required reliability.

Such malfunctioning may be averted in that the resources present in the technical system shall be allocated in a manner assuring the desired operability.

Illustratively network resources allocation may be implemented in such manner that, upon reaching a given system state, for instance a given data flow, additional transmission lines are inserted in particular network junction points or in the whole network in order to make available additional capacity for data transmission between individual junction points.

Resources also may be allocated in such a way that when reaching a maximum data flow, the just-operable network shall be blocked as a whole or at individual junction points against hookup to further subscribers until the transmissions of data to other subscribers has been completed and are shut off the network. In this manner those subscribers which at the time of network blocking had been hooked up to it are able to transmit data to any other subscriber.

The European patent document 0,248,812 B1 discloses a method allocating industrial or technical resources which illustratively may be applied in resource allocation in communications networks.

The objective of the invention is to create a method allocating industrial or technical resources in technical systems, said method being easily implemented and operationally reliable.

This problem is solved by the features of claim 1.

The disclosure of the present invention starts from the basic insight that in a technical system of which the operational state is denoted by parameters, for instance the operational state of a communications network, the data transmission rates at the individual junction points permit assigning different relevancies to the particular parameters with respect to system operability. If the function of a communications network for instance is to enable data transmission at any time between any subscribers, operational states may arise at which one or more network junction points are "overloaded", that is, the data transmission rates at said junction points have reached or exceeded a given data-transmission threshold value, without degrading the network's data transmission ability between arbitrary subscribers at all times.

On the other hand other operational states may arise in the network, again involving overloaded junction points, in which network operability is degraded, that is, data transmission between arbitrary subscribers no longer shall be feasible at any time.

In the light of the above, the concept of the invention is to determine a gauge of the effects of the individual parameters on system operability.

Accordingly the invention starts from a further insight that it suffices, when ascertaining the effects of the particular system operability parameters, to classify said parameters according to a given parameter value having been reached. Illustratively it may be enough in a communications network to classify the data flows at the individual junction points according to a given threshold value being unattained ("network junction point at admissible load") or being exceeded ("network junction point overloaded").

Moreover the invention is based one the concept to record operational system states having attained a predetermined system function, for instance that data transmission is feasible between two arbitrary subscribers in a communications network, in the form of instantaneous parameter values such as "junction point is operating at normal load" or "junction point is operating at excess load". and to compare pairwise the operational states so recorded in order to gauge therefrom the effects of the individual parameters on system operability.

Once the effects of individual parameters on system operability have been ascertained, the system resources can be allocated in such a way that a predetermined system function always shall be attained or be set as a goal.

After gauging the effects of the individual network junction points on the function of the communications network have been ascertained, hence once the relevance of the particular network junction points to network operability is known, the network can be kept at a given operational state, for instance by switching ON or OFF additional transmission lines, because the desired system function shall have been attained.

If for instance it is known that an individual or several network junction points is/are especially relevant to network operability, whereas other network junction points are less so, then additional transmission lines selectively switched ON or OFF by a control unit may be used in the area of the more relevant network junction points, whereas, in the area of the less relevant network junction points, such additional transmission lines will not be needed.

If during network operation sensors determine that the data transmission rate at the more relevant junction points regarding operability approaches a threshold value at which system operability is likely to be lost, then, before reaching such a threshold value, the additional transmission lines in the area of the particular junction point can be switched ON, and, after the data transmission rate drops below a predetermined value, can be shut OFF.

In this manner the method of the invention allows quick and efficient allocation of resources in a technical system.

Malfunctions in such systems can be reliably averted by means of the quick and efficient allocation of the method of the invention of resources in a technical system.

The method of the invention is applicable to arbitrary systems, for instance to control resources in communications networks, data processing equipment, pattern-recognition systems, in the control of automated vehicles in plants, etc.

Advantageous and appropriate developments of the disclosure of the invention are stated in the sub-claims.

The invention is elucidated below in relation to the attached drawings.

FIG. 1 is a block diagram of a communications network of subscriber stations connected to each other by network junction points and transmission lines, FIG. 2 is a block diagram of equipment implementing the method of the invention, FIG. 3 is a tabular listing of different operational states of the communications network of FIG. 1, the each data flow being denoted by the state "normal" or "overload as the parameter of the individual network junction point, FIGS. 4a, 5a, 6a, 7a, and 8a show test vectors generated by the method of the invention in different cycles, FIGS. 4b, 5b, 6b, 7b, and 8b show r matrices of counters resulting from the analysis of the test vectors of FIGS. 4a through 8a in the cycles of the method of the invention wherein the particular test vector was generated, FIG. 9 is a tabular listing of the resultant vectors of FIG. 3 associated with the particular operational states, and FIG. 10 shows the total resultant vector obtained by analyzing the resultant vectors of FIG. 9.

FIG. 1 shows a block diagram of a communications network 2 comprising subscriber stations T1–T8 and further subscriber stations omitted from FIG. 1. The subscriber stations T1, T2 are connected by lines b 4, 6 to a network junction point K3, the subscriber stations T3, T4 are connected by lines 8, 10 to a network junction point K5,the subscriber stations T5, T6 through lines 12, 14 to a network junction point K4 and the subscriber stations T7, T8 through lines 16, 18 to a network junction point K2.

A network junction point K1 is connected by a line L3 to the network junction point K3, by a line L4 to the network junction point K4 and by a line L5 to the network junction point K5.

The network junction point K2 is connected by a line L1 to the network junction point K3 and through a line L2 to the network point K4.

The network junction point K3 is connected by a line L7 switched by a control unit omitted from FIG. 1 to the network junction point K5.

The network junction point K4 is connected by a line L6 switched by said control unit to the network junction point K5.

The network junction point K5 is connected by the line L5 to the network junction point K1.

Sensors S1 through S5 are associated with the network junction points K1–K5 and each determine continuously, or following predetermined time intervals, the data transmission rate at the particular network junction point. The output signals from the sensors SI–S5 constitute the input signals at equipment omitted from FIG. 1 which shall carry out the method of the invention.

FIG. 2 shows equipment 20 to carry out the method of the invention and comprising a memory 22 of which the inputs 24–32 are connected to the outputs of sensors S1–S5 in such a way that the output signals from the sensors S1–S5 constitute the input signals of the memory 22.

The equipment 20 moreover comprises a control unit 34 connected to an analyzer 36 and a switching circuit 38 elucidated further below.

The analyzer 36 is connected to the memory 22.

The switching circuit 38 is driven by the control unit 34 to switch the transmission lines L6 and L7 ON and OFF the network and/or block temporarily in a manner further described below some of the subscriber stations T1–T8 as well as further subscriber systems (not shown) from accessing the communications network 2.

The embodiment shown in FIG. 2 of the equipment 20 of the invention is used to allocate data-transmitting resources available within the communications network 2. The equipment 20 operates in a manner elucidated below according to the method of the invention.

FIG. 3 is a table showing 10 different operational states B1–B10 of the communications network 2 of FIG. 1, the particular operational state of the network 2 being represented in each case by five parameter values which in the embodiment consist of the data flow at each network junction point K1–K5. The data flow at the network junction points K1–K5 are detected by the sensors S1–S5.

The particular parameter values are determined from the above-ascertained data flows for the network junction points K1–K5 either by devices mounted in the sensors S1–S5 or by further devices mounted between the sensors S1–S5 and the memory 22 determining the required parameter values in each operational state B1–B10 required for further processing in the course of the method of the invention.

The operational state "normal" shall be assigned to a network junction point K1–K5 if the data flow at the particular junction point is below a predetermined threshold value of said data flow and the junction point shall be assigned the parameter value "overload" if the data flow reaches or exceeds said threshold.

The operational states B1–B10 listed in FIG. 3 each relate to a predetermined function of the communications network 2 consisting, in the embodiment, in the ability to transmit at any time from an arbitrary subscriber station T1–T8 connected at that time to the communications network 2 to another arbitrary subscriber station T1–T8 which at that same time was connected to the network.

The predetermined function of the communications network 2 is attained both at the operational states B2, B5, B6, B9 and B10 wherein at least one of the parameter values is "overload" as well as in the operational states B1, B3, B4 and B7 wherein at least two parameter values are "overload".

On the other hand a further operational state is represented by the following parameter values:

| K1 | K2 | K3 | K4 | K5 |
|---|---|---|---|---|
| overload | normal | normal | normal | overload. |

In this operational state the communications network as a whole is overloaded and as a result the predetermined system function, namely the transmissibility of data from an arbitrary transcriber station T1–T8 to another arbitrary subscriber station T1–T8 no longer is assured.

The method of the invention allocating resources within the communications network 2 evolves as follows:

Appendix A shows a flowchart of an implementation of the method of the invention, said chart being referred to below, the method stages being denoted by ST1–ST53.

At the beginning of the method, the sensors, ie detectors S1–S5,detect those operational states of the communications network 2 denoted by their particular parameter values at which the said network reaches the predetermined function. For that purpose an operational state shall be stored in the memory 22 only when means omitted from the drawing detect that the predetermined function of the network 2 has been reached at that operational state. This procedure is repeated (steps ST1–ST3 ) until either all operational states at which the predetermined system function has been reached, or a given number of such operational states, have been stored.

As regards the communications network of FIG. 1, it is assumed that the predetermined system function is reached exclusively from the operational states, hereafter also termed "Examples", shown in FIG. 3.

After determining the table of FIG. 3 and storing it in the memory 22, a maximum value, in this embodiment the value 1, and a minimum value, in this embodiment the value 0, are predetermined by the control unit 34 for a first gauge (gauge of tolerance) of the effect of the individual parameters K1–K5 on system function, that is on the communications network 2.

Next the interval between the maximum and minimum values 1 and 0 is sub-divided into interval value elements which in this embodiment each are 0.1, whereby in this instance there are a total of 11 interval value elements, that is the values 0.0 to 1.0 (step ST10).

Thereupon, in step ST11, a matrix of counters is initialized, one of the parameters—in this embodiment the data flow at the network junction points K1–K5—being assigned to one of the matrix columns, and one of the previously formed interval value elements 0.01–1.0 is assigned to one matrix row. In this illustrative embodiment the counter matrix stored in the memory 22 therefore consists of 55 counters as shown in FIGS. 4b–8b. The drawing does not show, and therefore attention is drawn at this point, that first each counter is initialized at the same count value "1".

Next the control unit 34 selects a first of the stored operational states (Examples) as the test Example (step ST12).

Then the analyzer 36 generates a test vector (step ST13) which is stored in the memory 22, a random number corresponding to one of the interval value elements 0.0 through 1.0 being each associated to the test vector parameter. The probability of each interval value element being a random number is calculated from the proportion, of the particular counters of the interval value elements of the particular parameter, of all counters assigned to this parameter value.

FIGS. 4–8 show the test vectors resulting from the different cycles (passes) of the method of the invention and counter-matrix values resulting from the particular vector's analysis.

First the control unit 34 selects Example B1 as the test Example.

As regards this test Example, first the test vector shown in FIG. 4a is generated by generating a particular random number for one of the parameter values K1–K5 and then this test vector is stored in the memory 22 (steps ST15–ST19).

Then the test Example B1 is compared with the further stored operational states (Examples B2–B10) in steps ST24–ST31 to determine if there is a reference Example for this test Example. This shall be the case if the sum of the test-vector random numbers which are assigned to the parameters, wherein the test Example differs from another of the stored operational states, is less than a given value which in this embodiment is less than 1.0 (step ST28).

The results of comparing the test Example B1 with the Example B2 are as follows: the two Examples differ by their parameters K2 and K3. The random 0.4 and 0.6 numbers associated to these parameters in the test vector result in a sum of 1.0 and therefore the Example B2 is not a reference Example relative to the test Example B1.

The results of comparing the test Example B1 with the Example B3 are as follows: the two Examples differ by the parameters K4 and K5; the values of 0.8 and 0.1 associated with these parameters in the test vector add up to a sum 0.9. Therefore the Example B3 is a reference Example relating to the test Example B1.

The results of comparing the test Example B1 with Example B4 are as follows: the two Examples merely differ in the parameter K3 to which is assigned the value of 0.6 in the test vector. Accordingly the Example B4 also is a reference Example relating to the test Example B1.

Comparison of the test Example B1 with Example B7 results in the following: the two Examples merely differ in the feature K4 to which the value of 0.8 is assigned in the test vector. The sum therefore is 0.8 and accordingly Example B7 also is a reference Example relating to the test Example B1.

To analyze the test Example B1, and as regards the embodiment of the method of the invention, the test Example B1 is compared with every further Example B2–B10. However analysis of a test Example may already be terminated once a single reference Example has been found relating to this test Example.

After comparing the test Example B1 with the further Examples, those counters of the counter matrix shall be incremented by a predetermined count value (steps ST33–ST40) which are associated to the parameter values within which the reference Example differs from the test Example and with whom these interval value elements are associated in the test vector of these parameters (step ST38).

The predetermined counter value by which the particular counters are to be increased is given for the above embodiment by the following formula:

$$\text{predetermined counter value} = \text{RND (maximum counter value less the actual value)} \times 0.5$$

where RND is a rounding operation. In the present embodiment the maximum counter value (step ST8) is 100 and therefore the counter value by which the counters in the cycle shown FIG. 4 is raised is the value RND (½(100 less 1))=50.

Those counters of the counter matrix are incremented by this predetermined count value which are associated with the parameter values wherein the test Example differs from a reference Example and to whom are associated these parameters in the interval value elements associated in the test vector; in the present case therefore the counter associated with the parameter K3 and the interval value element 0.6, the counter associated with the parameter K4 and the interval value element 0.8 and the counter associated with the parameter K5 and the interval value element 0.1. The result is the counter matrix shown in FIG. 4b.

After the test vector has been analyzed in the manner of FIG. 4a, a new test vector is generated in the next cycle (step ST42) of the method of the invention as shown in FIG. 5a. Then the test Example B1 is compared with the further Examples B2–B10 in order to determine if at least one reference Example exists for the test vector of FIG. 5a.

It follows from pairwise comparison that the Examples B2, B3, B4 and B7 constitute reference Examples because as regards these Examples, the sum of the test-vector's random numbers which are associated with the parameters wherein the test Example B1 differs from the particular further Example has a value 0.9 (B2), 0.9 (B3), 0.6 (B4) or 0.8 (B7).

Within this cycle, therefore, the counter associated with the parameter K2 and the interval value element 0.3 is incremented by the value 50, the counter associated with the parameter K3 and the interval value element 0.6 is incremented by the count value 25, the counter associated with the parameter K4 and the interval value element 0.8 is incremented by the count value 25 and the counter associated with the parameter K5 and the interval value element 0.1 is incremented by the count value 25, resulting in the counter matrix shown in FIG. 5b.

FIGS. 6a, 7a and 8a each show the test vectors generated in the $3^{rd}$, $1,000^{th}$ and $10,000^{th}$ cycle for the test Example B1. FIGS. 6*b*, 7*b* and 8*b* show the counter matrices resulting each time after analyzing the associated test vectors in the pertinent cycles.

If no reference Example should exist relative to the test Example B1 when analyzing a test vector, then each time the counters of the counter matrix which are associated to the parameters and to the interval value elements associated with these parameters in the test vector—except for those count values which are "1"—shall be decremented by a given count value, and in this embodiment by a fourth of the instantaneous count value (step ST37).

Depending on the generation and analysis of a test vector, the method of the invention verifies (step ST43) relative to a parameter whether counters associated with this parameter and the interval value elements 0.0 through 1.0 have reached or exceeded, in a continuous interval (step ST6), starting at the lowest interval value element 0.0, in the illustrative embodiment, the value "80" which is predeterminable by the control unit.

In the present embodiment, this state is reached in the counter matrix of FIG. 8*b* for the parameters K3 and K4 because the counters associated with said parameters and starting at the interval value element 0.0 have the value 100 in a continuous interval, namely each time from 0.0 to 0.9, that is a value exceeding the predetermined threshold value.

On the other hand this state will not be attained for instance regarding the parameter K5 even though the counters associated with said parameters and the interval value elements 0.0, 0.2 and 0.3 are at a count larger than the threshold value 80, the counter which is associated with the parameter K5 and the interval value element 0.1 on the other hand is at a count of 75, that is below said threshold value. Consequently a reliable result has not been reached yet because too few test vectors were analyzed for the pertinent parameter.

Further test vectors may be generated and analyzed to arrive at a sufficiently reliable result.

Certain parameter configurations may arise while the method of the invention is being implemented wherein the "constrained" state regarding one or more parameters is such that none of the counters reaches the predetermined count. To prevent the method of the invention from running in circles, test-vector analysis regarding a test Example can be terminated at a given maximum number of cycles. Parameters of which the counters all are below the threshold value are assigned a predetermined interim result, preferably 0.0.

Because the drawing does not illustrate the term "constrained", the discussion below explains that the counter matrix assumes the following configuration in the "constrained state":

None of the counters associated to the parameter K1 exceeds the predetermined threshold value of "80".

As regards the counters associated to the parameter K2, those counters relating to said parameter and to the interval value elements 0.0 through 0.5 exceed the threshold value whereas the counters associated with said parameter and the interval value elements 0.6 through 1.0 are below the threshold value.

As regards the counters associated with the parameter K3, all those associated with the said parameter and the interval value elements 0.0 through 0.9 exceed the threshold value.

Of the counters associated with the parameter K4, all those associated to said parameter and the interval value elements 0.0 through 0.9 exceed the threshold.

Of the counters associated with the parameter K5, those related to said parameter and to the interval value elements 0.0 through 0.3 exceed the given threshold whereas those relating to said parameter and the interval value elements 0.4 through 1.0 are below said threshold value.

Thereupon, in the method of the invention, each parameter value K1 through K5 is assigned, as the interim result, the maximum value of those interval value elements, starting at the lowest one, namely 0.0, at which the associated counter reaches or exceeds the given threshold value. Accordingly the parameter K1 is assigned the value 0.0 as its interim result, the parameter K2 is assigned the interval value element 0.5, the parameters K3 and K4 each are assigned the interval value element 0.9 and the parameter K5 is assigned the interval value element 0.3.

Thereupon (step ST45) a resultant vector is formed wherein each parameter is assigned a final result calculated from the following formula Final result 32 maximum interval value element less interim result less subtrahend where preferably the subtrahend shall be 0.1.

For a maximum interval value element of 1.0, the interim results of Example B1 lead to a resultant vector as shown in the first row of the table of FIG. 9.

After a resultant vector of a test Example has been formed, the method of the invention allows forming further resultant vectors (steps ST46 through ST48) illustratively to verify the reliability of the results contained in the resultant vector. The resultant vector ascertained in the preceding method steps for the pertinent test Example is then stored as the instantaneous resultant vector.

Analysis of such a test Example is terminated (step ST47) after a final resultant vector has been determined for a test Example.

Thereupon each of the further Examples B2–B10 is selected as a test Example and test vectors are generated in the above described manner and analyzed, and lastly there shall be a resultant vector for each test Example (step ST53) as shown in the table of FIG. 9.

After a resultant vector has been ascertained for each Example B1–B10, an total resultant vector shall be formed (steps ST51–ST52) from the stored resultant vectors belonging to the individual operational states B1–B10. In the illustrative embodiment this procedure is implemented by forming the arithmetic average of all resultant vectors.

The total resultant vector formed from the resultant vectors of the table of FIG. 9 is shown in FIG. 10. The elements of the total resultant vector constitute a gauge (relevancy) of the effects of the parameters K1–K5 related to the particular elements on the function of the communications network 2.

Because a value of 0.7 is associated to the parameter K1 as a gauge of this parameter's effect on the operation of the communications network, whereas lesser values are assigned to the other parameters K2–K5, the parameter K1 shall be the one most affecting the functionality of the communications network 2.

In a similar manner the values of 0.2 associated with the parameters K2 and K3 reveal that said parameters are the least influential regarding the functionality of the communications network 2.

Consequently when the parameter associated with the network junction point K1, namely the data flow at said junction point, takes on the parameter value "overload", there is more danger of the communications network 2 breaking down than in case the parameter of the junction point K2 takes on the value "overload". Comparison with the table of FIG. 3 corroborates this conclusion because only one operational state, namely B5, among the operational states B1–B10 wherein the communications network 2 operates in the desired manner, is in the operational state at which the junction point K1 operates at "overload" whereas there are five operational states, namely B1, B3, B4, B7 and B10 within said operational states B1–B 10 at which the junction point K2 operates at "overload" without the operability of the communications network 2 being degraded.

Based on the total resultant vector which is stored in the memory 22, the equipment of the invention shown in FIG. 2 allocates as follows the resources of the communications network 2:

The communications network 2 is assumed being in the operational state B6, namely the data flow at the network junction points K1 through K4 is below the predetermined threshold value of said flow, in other words, the parameter values K1 through K4 assume the values "normal" (FIG. 3) whereas the data flow rate at the network junction point K5 reaches or exceeds the predetermined threshold value of said flow, i.e. the K5 parameter value is "overload". The instantaneous data flows at the network junction points K1–K5 are determined by the corresponding sensors S1–S5 and are stored in the memory 22.

The control unit 34 compares the particular instantaneous operational state in the light of its particular instantaneous parameter value with the operational states B1–B10 stored in the memory 22.

If in addition to the junction point K5 the junction point K1 also were to operate at "overloads", then the communications network 2 would break down (see above) because the resultant operational state would be outside the acceptable operational ones listed in the table of FIG. 3.

If now the sensor S1 determines that the data flow is rising at the junction point K1 and approaches the given data-flow threshold value, then the control unit will alter the resources allocation in the communications network 2. Such alteration may take place in the embodiment of FIGS. 1 and 2 either in that the heretofore disconnected lines L6 and L7 are connected into the network or that further subscriber stations as yet not connected to the network shall be blocked from accessing it.

After the lines L6 and L7 have been connected to the network, direct links have been created between the network junction point K5 on one hand and on the other hand the network junction points K4 and K3, whereby data transmission is feasible not only through the junction point K1 but also directly. The load on the network junction point K1 is thus reduced, its data flow drops and the danger of its reaching or exceeding the threshold value is averted.

If the data flow rate at the junction point K1 drops below a given value, the lines L6 and L7 no longer are required and may be disconnected from the network. Such disconnection is a saving in operating costs relating to the lines L6 and L7 or allows using them on another network.

The method and equipment of the invention in this manner allow allocating resources in the communications network 2 more effectively and more reliably. Breakdown of the communications network 2 on account of overloading and consequent malfunctioning of data transmissions between the subscriber stations thereby are reliably averted without the need for the lines L6 and L7 being constantly hooked-up into said network.

What is claimed is:

1. A method for allocating industrial or technical resources within technical systems, in particular for the purpose of avoiding malfunctioning technical systems, the system's operational state being represented by at least two parameter values, comprising: p1 (a) as regards at least three different operational system states (Examples) at each of which a particular given system function is attained, the parameter values relating to the particular operational state are detected by detectors and stored in a memory, and (b) by pairwise comparing each time two operational states represented by the associated parameter values, a gauge of the effects of the individual parameter values on system function is ascertained.

2. Method as claimed in claim 1, wherein dependent from the gauge ascertained in step (b), the system resources are allocated in such manner that the parameter values are such as to entail an operational state wherein the predetermined system function is attained.

3. Method as claimed in either of claim 1, wherein in step (b):

(b1) a maximum value of 1 and a minimum value of 0 are predetermined for a first gauge (tolerance gauge) of the effect of the individual parameters on system function, (b2) the interval formed between the maximum and minimum values is subdivided into interval value elements spaced by 0.1, (b3) a matrix of counters is initialized, each matrix column being assigned one of the system parameters and each matrix row being assigned one of the interval-element values formed in step (b2), or each matrix column is associated with one of the interval-element values formed in step (b2) and each matrix row is associated with one of the system parameters, (b4) a control unit selects a first of the stored operational states as a test Example, (b5) a test vector is generated by an analyzer and is stored in a memory, the number of test-vector elements corresponding to the number of parameters, a random number corresponding to one of the interval-element values of step (b2) being assigned to each parameter in the test vector, (b6) the test Example is compared with the further, stored operational states in order to determine whether a reference Example relative to the test Example exists at said operational states, a reference Example being in existence when a sum of the random numbers of the test vector which are assigned to the parameters wherein the test Example differs from a further one of the stored operational states is smaller than a predetermined value less than 1, and (b7) in the presence of at least one reference Example, those counters of the counter matrix are incremented by a first predetermined count value which are assigned to the parameters wherein the reference Example differs from the test Example and to which are assigned interval-element values per step (b2) associated with test-vector parameters, or that in the absence of a reference Example those counters of the counter matrix are decremented which are assigned to the parameters and to the interval-element values in the test vector.

4. Method as claimed in claim 3, wherein the steps (b5) through (b7) are repeated until at least one counter associated with a parameter attains or exceeds a predetermined threshold value.

5. Method as claimed in claim 3, wherein the steps (b5) through (b7) are repeated, until at least one counter assigned to at least two parameters attains or exceeds a given threshold value.

6. Method as claimed in claim 3, wherein the steps (b5) through (b7) are repeated until, in relation to the parameters, where at least one counter assigned to said parameters has attained or exceeded the given threshold value, those counters which reach or exceed this threshold value are associated with consecutive interval-element values in such manner that the interval-element values associated with these counters form a closed interval starting from the lowest interval-element value of 0.0.

7. Method as claimed in claim 3, wherein: p1 (c) each parameter is assigned consecutive interval-element values starting from the lowest one, at which interval-element values the associated counter attains or exceeds the given threshold value.

8. Method as claimed in claim 7, wherein: p1 (d) a resultant vector is formed wherein each parameter is assigned an end result computed by the following formula $$\text{end result} = \text{maximum interval-element value less interim result less subtrahend}$$

where the subtrahend is 0.1.

9. Method as claimed in claim 8, wherein the steps (b3) through (b7), (c) and (d) are repeated for each test Example in order to form at least one further resultant vector for this test Example.

10. Method as claimed in claim 3, wherein one resultant vector is determined for each stored operational state (Example).

11. Method as claimed in claim 10, wherein a total resultant vector is formed from the resultant vectors ascertained from the stored operational states, by forming the arithmetic average of the resultant vectors determined from the individually stored operational states, the elements of said total resultant vector constituting a second gauge (relevancy) of the effect of the parameters associated to the particular vector elements on system function.

12. Method as claimed in claim 3, wherein in step (3b) each counter is initialized at the same initial value.

13. Method as claimed in claim 3, wherein the first predetermined count value by which the counters of the counter matrix in step (b7) may be incremented each time are calculated using the following formula:

$$\text{first predetermined count value} = \text{RND} ((\text{maximum count value} - \text{instantaneous counter's count value}) \times \text{first predetermined matching factor})$$

where RND is a rounding operation and the first predetermined matching factor is 0.5.

14. Method as claimed in claim 3, wherein the second predetermined count value by which the counters of the counter matrix in step (b7) were called for are each decremented is calculated from the following formula $$2^{nd} \text{ predetermined count value} = \text{RND} (\text{instantaneous rounded values} \times 2_{nd} \text{ predetermined matching factor})$$

where RND is a rounding operation, the $2_{nd}$ predetermined matching factor is 0 for those counters of which the instantaneous count value is 1, in such manner that these counters are not decremented, and is 0.25 for the remaining counters to be decremented in step (b7).

15. Method as claimed in claim 3, wherein in step (b7) the pertinent counters are incremented only when at least two reference Examples are existent for each test Example.

16. Method as claimed in claim 3, wherein in step (b7) the pertinent counters are incremented only if one or more reference Example(s) is or are existent relative to the test Example and if for each parameter there is at least one reference Example at which the value of said parameter of the reference Example deviates from the parameter value of the test Example.

17. Equipment to allocate industrial or technic resources within technical system, in particular for the purpose of averting technical-system malfunctions, wherein said equipment operates in the manner claimed in claim 1.

* * * * *